(12) United States Patent
Yoneda

(10) Patent No.: US 9,019,385 B2
(45) Date of Patent: Apr. 28, 2015

(54) INFORMATION PROCESSING APPARATUS, CONTROL METHOD, RECORDING MEDIUM, AND IMAGE SENSING SYSTEM

(71) Applicant: Canon Kabushiki Kaisha, Tokyo (JP)

(72) Inventor: Naoto Yoneda, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 92 days.

(21) Appl. No.: 13/857,442

(22) Filed: Apr. 5, 2013

(65) Prior Publication Data

US 2013/0265449 A1 Oct. 10, 2013

(30) Foreign Application Priority Data

Apr. 10, 2012 (JP) ................................ 2012-089677

(51) Int. Cl.
*H04N 5/225* (2006.01)
*G06F 3/00* (2006.01)
*H04N 5/232* (2006.01)
*H04N 101/00* (2006.01)

(52) U.S. Cl.
CPC ............ *G06F 3/005* (2013.01); *H04N 5/23206* (2013.01); *H04N 5/23229* (2013.01); *H04N 2101/00* (2013.01)

(58) Field of Classification Search
USPC ........................................................ 348/207.1
See application file for complete search history.

(56) References Cited

FOREIGN PATENT DOCUMENTS

JP 2007-124054 A 5/2007
JP 2010-245810 A 10/2010

*Primary Examiner* — Usman Khan
(74) *Attorney, Agent, or Firm* — Cowan, Liebowitz & Latman, P.C.

(57) ABSTRACT

An object is to efficiently set an image processing parameter for a connected image sensing apparatus. In this specification, the image processing parameter for a developed image is set while displaying the developed image received from the image sensing apparatus. The set image processing parameter is transmitted to the image sensing apparatus and also held in a storage region. Upon detecting that the communication connection with the image sensing apparatus was disconnected and then reconnected, the information processing apparatus transmits the image processing parameter held in the storage region to the image sensing apparatus.

19 Claims, 5 Drawing Sheets

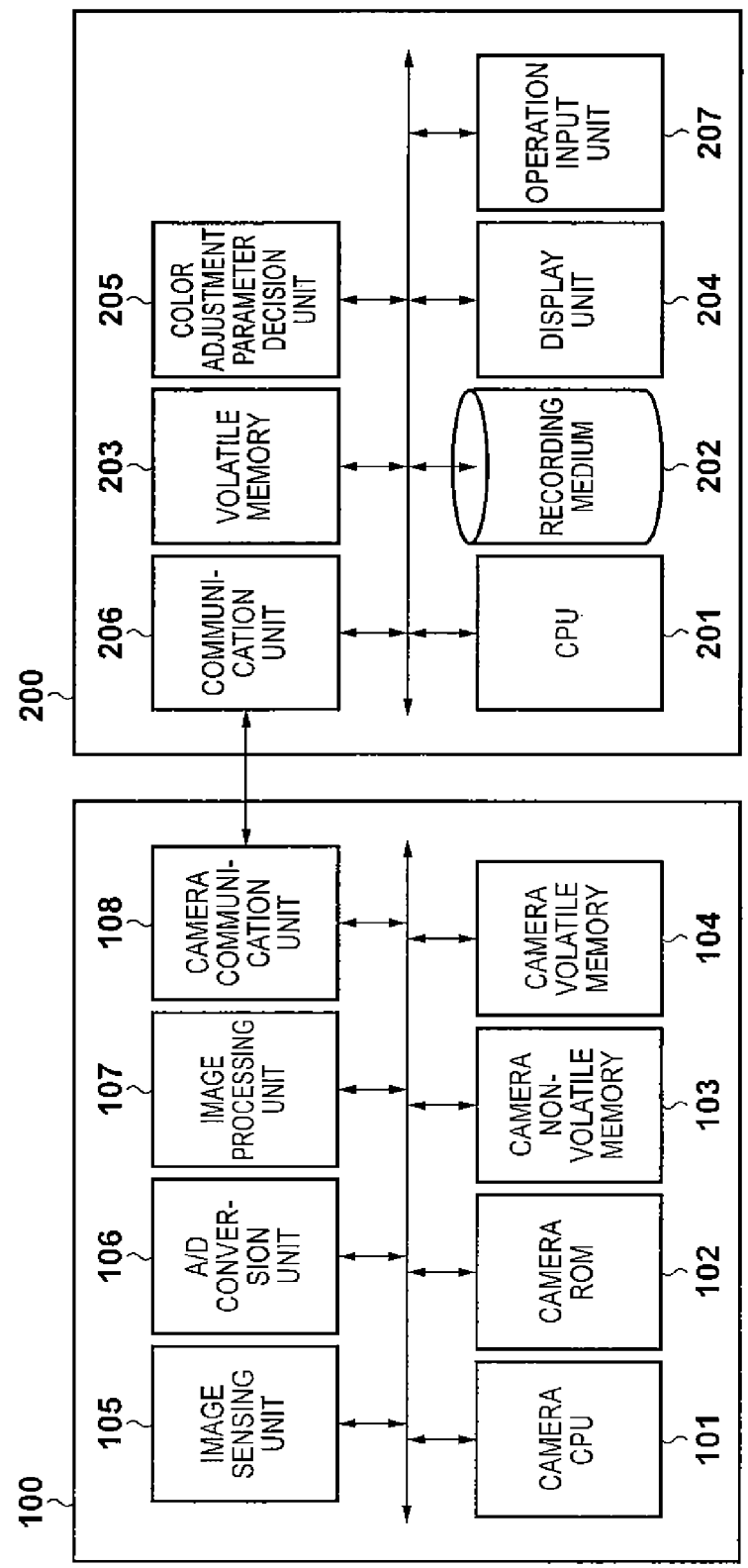

FIG. 2A

```
PERMANENT REGISTRATION

WOULD YOU PERMANENTLY REGISTER
COLOR ADJUSTMENT DATA IN IMAGE SENSING APPARATUS?

[ YES ]      [ NO ]
```

FIG. 2B

```
ADJUSTMENT RESUMPTION

THERE IS COLOR ADJUSTMENT DATA ADJUSTED PREVIOUSLY.
WOULD YOU RESUME COLOR ADJUSTMENT
FROM THIS COLOR ADJUSTMENT DATA?

[ YES ]      [ NO ]
```

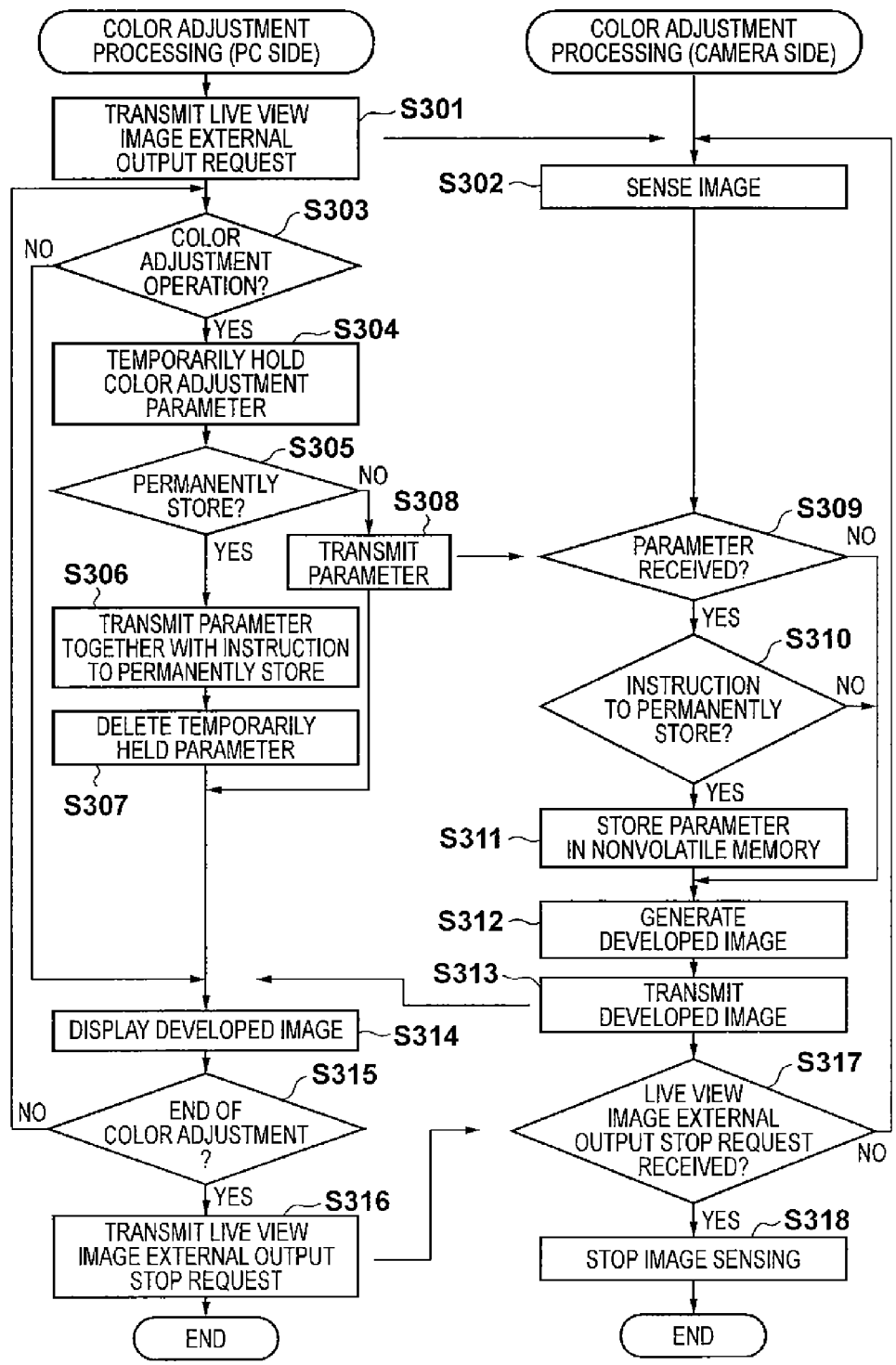

INFORMATION PROCESSING APPARATUS, CONTROL METHOD, RECORDING MEDIUM, AND IMAGE SENSING SYSTEM

BACKGROUND OF THE INVENTION

1. Field of the Invention

The present invention relates to an information processing apparatus, a control method, a recording medium, and an image sensing system, and particularly to a technique of causing an external apparatus to set an adjustment parameter for image processing by an image sensing apparatus.

2. Description of the Related Art

An image sensing apparatus such as a digital camera or a digital video camera can display an image sensing signal on its display device, thereby providing the image under sensing to the user as a live view image. Some image sensing apparatuses control the display method of the display device. Japanese Patent Laid-Open No. 2010-245810 discloses an image sensing apparatus that has a mode to adjust an image sensing signal under factory default conditions and then display the image, and a mode to perform adjustment reflecting set image sensing settings and then display the image.

Some image sensing apparatuses allow an external apparatus to set an image processing parameter applied when displaying an image sensing signal. Japanese Patent Laid-Open No. 2007-124054 discloses an image processing parameter setting apparatus that displays an image sensing signal received from an image sensing apparatus on a connected display device and transfers an image processing parameter adjusted by the user while viewing the display to the image sensing apparatus.

When an external apparatus adjusts an image processing parameter for an image sensing apparatus, as in Japanese Patent Laid-Open No. 2007-124054, the external apparatus frequently transfers the image processing parameter, and the image sensing apparatus outputs an image sensing signal reflecting the image processing parameter to the external apparatus. For this reason, the image sensing apparatus needs to receive and apply the image processing parameter every time it is updated.

The image processing parameter after adjustment is preferably held in a desired state and therefore stored in, for example, a nonvolatile memory such as a flash memory provided in the image sensing apparatus. However, the nonvolatile memory generally has a limited delete/write durability count. Hence, the image processing parameter under adjustment is not stored in the nonvolatile memory. Instead, the image processing parameter is temporarily stored in a volatile memory such as a RAM and used for image processing.

On the other hand, when the communication connection between the image sensing apparatus and the external apparatus is unintentionally disconnected, or unintended power discontinuity or the like occurs in the image sensing apparatus, the information temporarily stored in the volatile memory of the image sensing apparatus may be lost. That is, if the image processing parameter stored in the volatile memory of the image sensing apparatus during adjustment of the image processing parameter, as described above, is lost, the user needs to perform parameter adjustment again. Since the adjustment contents are complex for a color adjustment parameter and the like in particular, it is not preferable to cause the user to redo the parameter adjustment.

SUMMARY OF THE INVENTION

The present invention has been made in consideration of the above-described problem of the related art. The present invention provides an information processing apparatus for efficiently setting an image processing parameter for a connected image sensing apparatus, a control method, a recording medium, and an image sensing system.

The present invention in its first aspect provides an information processing apparatus for setting an image processing parameter used to generate a developed image in a connected image sensing apparatus and transmitting the image processing parameter to the image sensing apparatus, comprising: a reception unit configured to receive the developed image from the image sensing apparatus; a display unit configured to display the developed image received by the reception unit; a setting unit configured to set the image processing parameter to generate a developed image; a transmission unit configured to transmit the image processing parameter set by the setting unit to the image sensing apparatus; a holding unit configured to hold, in a storage unit, the image processing parameter set by the setting unit; and a detection unit configured to detect communication connection with the image sensing apparatus, wherein when the detection unit has detected that the communication connection was disconnected and then reconnected, the transmission unit transmits the image processing parameter held in the storage unit to the image sensing apparatus.

Further features of the present invention will become apparent from the following description of exemplary embodiments (with reference to the attached drawings).

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

FIG. 1 is a block diagram showing the functional arrangement of an image sensing system according to the embodiment of the present invention;

FIGS. 2A and 2B are views illustrating examples of a GUI displayed on a display unit 204 according to the embodiment of the present invention;

FIG. 3 is a flowchart illustrating the procedure of color adjustment processing in the image sensing system according to the embodiment of the present invention;

Figure 4:
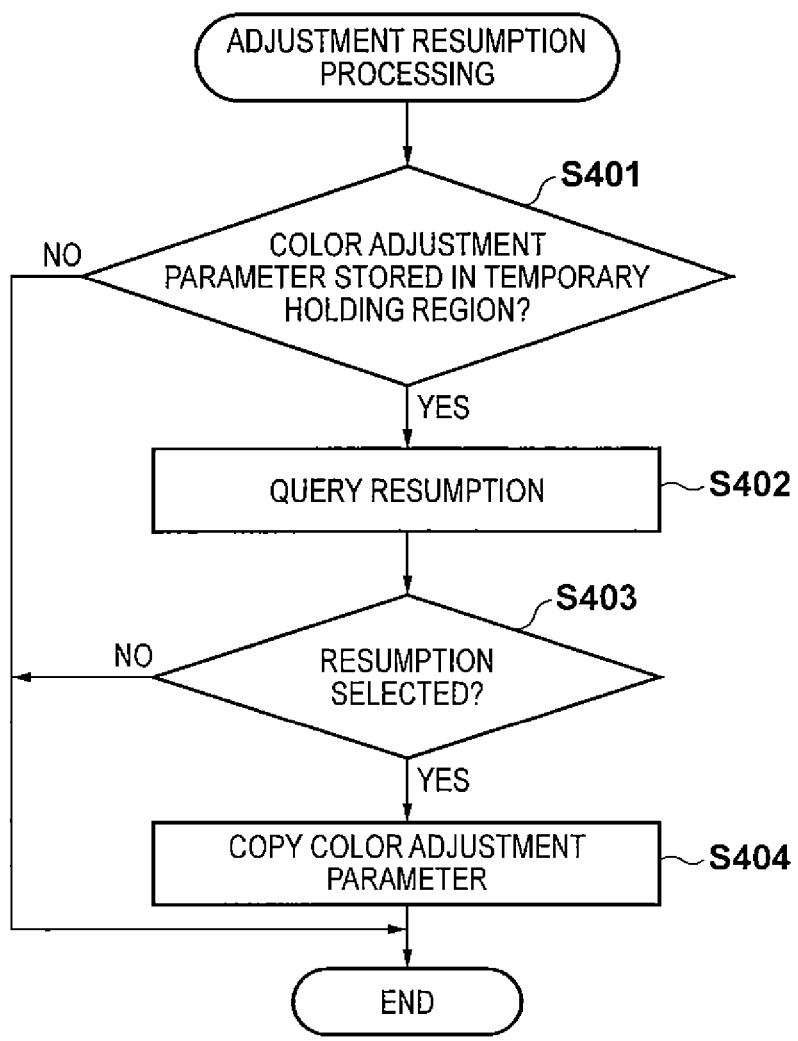
FIG. 4 is a flowchart illustrating adjustment resumption processing executed by a PC 200 according to the embodiment of the present invention.

Various exemplary embodiments, features, and aspects of the invention will be described in detail below with reference to the drawings.

DESCRIPTION OF THE EMBODIMENTS

[Embodiment]

An exemplary embodiment of the present invention will now be described in detail with reference to the accompanying drawings. Note that in the following embodiment, an example will be explained in which the present invention is applied to a digital camera and a PC capable of setting an image processing parameter used to generate a developed image in the digital camera, which constitute an example of an image sensing system. However, the present invention is applicable to an arbitrary device capable of setting an image processing parameter used to generate a developed image in an image sensing apparatus. Note that in this embodiment, the description will be made assuming that the PC sets a color adjustment parameter used for color adjustment of a developed image as the image processing parameter in the digital camera. However, the image processing parameter is not limited to this. The present invention can be applied to an arbitrary parameter such as the number of pixels or a cutout region used to generate a developed image.

2] Arrangement of Image Sensing System>

FIG. 1 is a block diagram showing the functional arrangement of an image sensing system according to the embodiment of the present invention. As shown in FIG. 1, the image sensing system includes a digital camera 100 and a PC 200, which are connected by, for example, USB (Universal Serial Bus) via each other's communication units. Note that in the following description, similar components in the digital camera 100 and the PC 200 are discriminated by adding a prefix "camera" to only components provided in the digital camera 100.

(Functional Arrangement of Digital Camera 100)

A camera CPU 101 controls the operations of blocks of the digital camera 100. More specifically, the camera CPU 101 reads out the operation programs of the blocks stored in a camera ROM 102, and extracts and executes them on a camera RAM (not shown), thereby controlling the operations of the blocks.

The camera ROM 102 is a rewritable nonvolatile memory and stores identification information representing the model type or individual type of the digital camera 100, and the like, as well as the operation programs of the blocks of the digital camera 100.

A camera nonvolatile memory 103 is a storage region that permanently stores a color adjustment parameter used by an image processing unit 107 to be described later in processing of generating a developed image. A camera volatile memory 104 is a storage region that temporarily stores the color adjustment parameter used in the processing of generating a developed image. As described above, the color adjustment parameter received from the PC 200 is stored in the camera nonvolatile memory 103 not necessarily after each reception but only when, for example, an instruction to permanently store it is received.

Note that the expression "permanently" does not guarantee permanent storage, and indicates continuous storage relative to the expression "temporarily" when the color adjustment parameter is temporarily stored in the camera volatile memory 104.

An image sensing unit 105 includes an image sensor such as a CCD or CMOS sensor. The image sensing unit 105 photo-electrically converts an optical image formed on the imaging plane of the image sensor through an optical system (not shown), thereby outputting an analog image signal that is an image sensing signal. Image sensing signal read by the image sensing unit 105 is done in synchronism with a timing signal generated by the camera CPU 101.

An A/D conversion unit 106 applies A/D conversion processing to the analog image signal output from the image sensing unit 105, thereby converting the analog image signal into digital image data (RAW data) and outputting it.

The image processing unit 107 applies predetermined image processing to the digital image data output from the A/D conversion unit 106, thereby generating a developed image. In this embodiment, when generating the developed image, the image processing unit 107 uses the color adjustment parameter stored in the camera nonvolatile memory 103 or the camera volatile memory 104.

A camera communication unit 108 is a communication interface of the digital camera 100 and, in this embodiment, transmits/receives data to/from the USB-connected PC 200. Upon receiving a live view image external output request, the camera communication unit 108 transmits the developed image generated by the image processing unit 107 to the PC 200. In addition, when the PC 200 has changed the color adjustment parameter used to generate the developed image, the camera communication unit 108 receives the changed color adjustment parameter.

In this embodiment, the color adjustment parameter received together with an instruction to permanently store it is stored in the camera nonvolatile memory 103 by the camera CPU 101. Without the instruction, the color adjustment parameter is stored in the camera volatile memory 104. The color adjustment parameter stored in the camera volatile memory 104 is read out by the camera CPU 101 at a predetermined time interval and stored in the camera nonvolatile memory 103.

The color adjustment parameter can be a parameter such as a contrast or a tone curve used in general color adjustment processing. The color adjustment parameter can represent either an absolute value or a relative value to change the color adjustment parameter currently held in the digital camera 100.

The camera communication unit 108 can also monitor the communication connection with the PC 200 and detect establishment of the communication connection and disconnection of the communication connection.

(Functional Arrangement of PC 200)

A CPU 201 controls the operations of blocks of the PC 200. More specifically, the CPU 201 reads out the operation program of color adjustment processing (to be described later) stored in a recording medium 202, and extracts and executes it on a volatile memory 203, thereby controlling the operations of the blocks.

The volatile memory 203 is used as a region to temporarily store a developed image received by a communication unit 206 to be described later. The volatile memory 203 also stores the color adjustment parameter to be adjusted by the color adjustment processing.

The recording medium 202 is a recording device of the PC 200, in which a file system manages data write and read. The recording medium 202 stores setting information and the like necessary for the operation of the blocks in addition to the operation program of the color adjustment processing. In this embodiment, the recording medium 202 is provided with a region to temporarily store the adjusted color adjustment parameter. More specifically, the color adjustment parameter adjusted by the color adjustment processing is read out from the volatile memory 203 by the camera CPU 101 at a predetermined interval and stored in the region of the recording medium 202 to temporarily hold it.

A display unit 204 is a display device such as an LCD connected to the PC 200. In this embodiment, when the color adjustment processing program is executed in the PC 200, the display unit 204 displays the developed image received from the digital camera 100. That is, the display unit 204 displays the live view image on the digital camera 100, and the user can set the color adjustment parameter while viewing the image.

A color adjustment parameter decision unit 205 decides the color adjustment parameter and generates color adjustment data used to transfer the color adjustment parameter to the digital camera 100 in accordance with a user operation in the color adjustment processing.

The communication unit 206 is a communication interface of the PC 200 and, in this embodiment, transmits/receives data to/from the USB-connected digital camera 100. The communication unit 206 transmits a live view image external output request to the digital camera 100, thereby receiving a developed image that is a live view image from the digital camera 100. In addition, when the color adjustment parameter is changed by the color adjustment processing, the communication unit 206 transmits color adjustment data including the new color adjustment parameter to the digital camera 100. The communication unit 206 can also monitor the communication connection with the digital camera 100 and detect establishment of the communication connection and disconnection of the communication connection.

An operation input unit 207 is a user interface such as a mouse or a keyboard of the PC 200. Upon detecting input to the user interface, the operation input unit 207 sends a control signal corresponding to the input to the CPU 201.

<Color Adjustment Processing>

The basic procedure of the color adjustment processing of the image sensing system according to the embodiment having the above-described arrangement will be described in detail with reference to the flowchart of FIG. 3. In the PC 200, processing corresponding to the flowchart can be implemented by causing the CPU 201 to, for example, read out a corresponding processing program stored in the recording medium 202 and extract and execute it on the volatile memory 203. In the digital camera 100, the processing can be implemented by causing the camera CPU 101 to read out a corresponding processing program stored in the camera ROM 102 and execute it. Note that the description will be made assuming that the color adjustment processing starts when, for example, a color adjustment application is activated on the PC 200.

In step S301, the CPU 201 transmits a live view image external output request to the digital camera 100. More specifically, the CPU 201 transfers data concerning the external output request to the communication unit 206 and causes it to transmit the request to the digital camera 100.

Upon receiving the live view image external output request, the camera CPU 101 causes the image sensing unit 105 to perform image sensing in step S302. More specifically, in this step, the camera CPU 101 causes the image sensing unit 105 to sense an object at a predetermined time interval and the A/D conversion unit 106 to convert the obtained image sensing signal into digital image data and output it. Note that the processing of this step is executed at a predetermined image sensing time interval. Note that as for the image sensing time interval in this step, a time interval may be preset in the digital camera 100, or the PC 200 may transmit the image output request at a predetermined time interval. Alternatively, the PC 200 may transmit the next image output request upon receiving a live view image. Otherwise, the camera CPU 101 may output the next image in accordance with image output from the digital camera 100 to the PC 200.

In step S303, the CPU 201 determines whether an operation input concerning color adjustment has been done by the user. More specifically, the CPU 201 determines whether a control signal concerning color adjustment has been received from the operation input unit 207. Upon determining that the operation input concerning color adjustment has been done, the CPU 201 transfers the operation contents to the color adjustment parameter decision unit 205, reflects the operation contents on the color adjustment parameter under adjustment stored in the volatile memory 203, and then advances the process to step S304. Upon determining that the operation input concerning color adjustment has not been done, the CPU 201 advances the process to step S314.

In step S304, the CPU 201 stores, in the temporary holding region of the recording medium 202, the color adjustment parameter under adjustment stored in the volatile memory 203.

In step S305, the CPU 201 determines whether to permanently store, in the digital camera 100, the color adjustment parameter stored in the temporary holding region. More specifically, the CPU 201 determines whether a control signal corresponding to a user instruction to permanently store the color adjustment parameter in the digital camera 100 has been received from the operation input unit 207. Note that whether to permanently store the color adjustment parameter may be determined by causing the display unit 204 to display screen data generated using, for example, GUI data as shown in FIG. 2A after reception of a storage instruction and determining whether confirmation input by the user has been accepted. To permanently store the color adjustment parameter in the digital camera 100, the CPU 201 advances the process to step S306.

If "NO" is selected on the screen data shown in FIG. 2A, or no instruction to permanently store is received even after the elapse of a predetermined time, the CPU 201 determines that the adjustment aims at only reflection and advances the process to step S308. Note that the convenience can also be improved by causing the CPU 201 to automatically transmit the new color adjustment parameter after the change to the digital camera 100 in accordance with occurrence of the color adjustment operation independently of whether to seek user determination using screen data as shown in FIG. 2A. In this case, the user can immediately confirm a preview image using the new parameter following the color adjustment parameter setting/changing operation.

In step S306, the CPU 201 transmits the color adjustment parameter stored in the temporary holding region to the digital camera 100 together with an instruction to permanently store the color adjustment parameter. More specifically, the CPU 201 generates color adjustment data including the color adjustment parameter and the instruction to permanently store and transfers the color adjustment data to the communication unit 206, and causes it to transmit the color adjustment data to the digital camera 100.

In step S307, the CPU 201 deletes the color adjustment parameter stored in the temporary holding region from the recording medium 202. In this embodiment, when an instruction to permanently store the color adjustment parameter is received, the color adjustment parameter is deleted from the temporary holding region in this step. However, the present invention is not limited to this. Since the communication connection between the PC 200 and the digital camera 100 may be disconnected during color adjustment parameter transmission, the CPU 201 may delete the color adjustment parameter upon receiving, from the digital camera 100, information representing that reception of the color adjustment parameter is completed.

If it is determined in step S305 that the color adjustment parameter has been changed by adjustment aiming at only reflection, the CPU 201 transfers the color adjustment parameter stored in the temporary holding region to the digital camera 100 in step S308. More specifically, the CPU 201 generates color adjustment data including the color adjustment parameter but no instruction to permanently store and transfers the color adjustment data to the communication unit 206, and causes it to transmit the color adjustment data to the digital camera 100 (second transmission). Note that in step S308, the CPU 201 may transmit the changed color adjustment parameter to the digital camera 100 together with an instruction to temporarily store.

In step S309, the camera CPU 101 determines whether the color adjustment data has been received (first reception). More specifically, the camera CPU 101 determines whether the camera communication unit 108 has received the color adjustment data. Upon receiving the color adjustment data, the camera CPU 101 stores it in the camera volatile memory 104 and advances the process to step S310. If no color adjustment data is received, the camera CPU 101 advances the process to step S312.

In step S310, the camera CPU 101 parses the color adjustment data and determines whether an instruction to permanently store is included. Upon determining that the instruction to permanently store is included, the camera CPU 101 advances the process to step S311. Upon determining that the instruction is not included, the camera CPU 101 advances the process to step S312.

In step S311, the camera CPU 101 copies the color adjustment data stored in the camera volatile memory 104 to the camera nonvolatile memory 103 and updates the color adjustment parameter stored in the camera nonvolatile memory 103.

In step S312, the camera CPU 101 causes the image processing unit 107 to generate a developed image by reflecting the color adjustment parameter on the image data obtained in step S302. Note that in the developed image generation of this step, if the color adjustment parameter is stored in the camera volatile memory 104, the color adjustment parameter is used. If the color adjustment parameter is not stored in the camera volatile memory 104, the color adjustment parameter stored in the camera nonvolatile memory 103 is used.

In step S313, the camera CPU 101 transfers the developed image generated by the image processing unit 107 to the camera communication unit 108 and causes it to transmit the developed image to the PC 200 (first transmission).

Upon detecting that the communication unit 206 has received the developed image (second reception), the CPU 201 causes the display unit 204 to display the received developed image in step S314.

In step S315, the CPU 201 determines whether the color adjustment has ended. More specifically, the CPU 201 determines whether a control signal corresponding to a color adjustment termination instruction has been received from the operation input unit 207. Upon determining that the color adjustment has ended, the CPU 201 advances the process to step S316. Upon determining that the color adjustment has not ended, the CPU 201 returns the process to step S303.

In step S316, the CPU 201 transmits a live view image external output stop request to the digital camera 100. More specifically, the CPU 201 transfers data concerning the external output stop request to the communication unit 206 and causes it to transmit the request to the digital camera 100, thereby completing the color adjustment processing.

In step S317, the camera CPU 101 determines whether the live view image external output stop request has been received from the PC 200 via the camera communication unit 108. Upon determining that the live view image external output stop request has been received, the camera CPU 101 advances the process to step S318. Upon determining that the live view image external output stop request has not been received, the camera CPU 101 returns the process to step S302.

In step S318, the camera CPU 101 causes the image sensing unit 105 to stop image sensing and stops live view image external output, thereby completing the color adjustment processing.

Note that as long as no external output stop request is transmitted in step S316, the processes of steps S303 to S318 and S314 and S315 loop in the PC 200, and the CPU 201 continues monitoring whether the user performs the color adjustment parameter setting operation.

Note that as long as no external output stop request is received in step S317, the processes of steps S302 and S309 to S313 loop, and the camera CPU 101 continues sensing a preview image at a predetermined image sensing interval and transmitting the image.

With this processing, when the user performs the color adjustment parameter setting operation, the changed color adjustment parameter is immediately sent to the digital camera 100, and the user can confirm the preview image using the changed color adjustment parameter.

Note that if the communication between the PC 200 and the digital camera 100 or the image processing in the digital camera 100 takes a long time, the user may additionally change the parameter before he/she confirms the image on which the changed setting is reflected. In this case, the parameter may excessively be changed, and it may be impossible to obtain a parameter close to a desired parameter.

To prevent this, if the color adjustment parameter has been changed again during the time from the color adjustment parameter transmission in step S308 to transmission of the developed image using the transmitted parameter, the CPU 201 is prohibited from accepting the changing operation.

<Adjustment Resumption Processing>

Adjustment resumption processing of the PC 200 according to this embodiment will be described next in detail with reference to the flowchart of FIG. 4. Processing corresponding to the flowchart can be implemented by causing the CPU 201 to, for example, read out a corresponding processing program stored in the recording medium 202 and extract and execute it on the volatile memory 203.

Note that the description will be made assuming that the adjustment resumption processing starts when, for example, a color adjustment application is activated on the PC 200. However, the practice of the present invention is not limited to this. For example, the adjustment resumption processing starts when the communication connection with the digital camera 100 is disconnected during color adjustment, and the digital camera 100 is connected again. That is, the adjustment resumption processing is also executed when the digital camera 100 and the PC 200 are reconnected. In addition, the adjustment resumption processing is executed immediately before the above-described color adjustment processing.

In step S401, the CPU 201 determines whether the color adjustment parameter is stored in the temporary holding region of the recording medium 202. Upon determining that the color adjustment parameter is stored in the temporary holding region, the CPU 201 advances the process to step S402. If the color adjustment parameter is not stored in the temporary holding region, that is, if the previous color adjustment processing has ended after permanently storing the color adjustment parameter in the digital camera 100, the CPU 201 completes the adjustment resumption processing.

In step S402, the CPU 201 causes the display unit 204 to display screen data generated using, for example, GUI data as shown in FIG. 2B and queries the user whether to resume the color adjustment using the color adjustment parameter stored in the temporary holding region.

In step S403, the CPU 201 determines whether the user has selected to resume the color adjustment using the color adjustment parameter stored in the temporary holding region. More specifically, the CPU 201 determines based on a control signal received from the operation input unit 207 which one of resumption and non-resumption of color adjustment has been selected. Upon determining that resuming the color adjustment using the color adjustment parameter stored in the temporary holding region has been selected, the CPU 201 advances the process to step S404. Upon determining that resuming has not been selected, the CPU 201 completes the adjustment resumption processing.

In step S404, the CPU 201 copies the color adjustment parameter stored in the temporary holding region to the volatile memory 203. This allows to resume the above-described color adjustment processing using the color adjustment parameter.

In addition, even in case of sudden communication disconnection, the CPU 201 can reuse the held color adjustment parameter and transmit the parameter halfway through the adjustment to the digital camera 100. This allows to save time to redo the parameter generation from the beginning.

In the above-described color adjustment processing, when permanently storing the color adjustment parameter in the digital camera 100, the color adjustment parameter is deleted from the temporary holding region. For this reason, even if the communication connection is disconnected during the time from the permanent storage to the next color adjustment parameter change, the CPU 201 does not resume the adjustment using the previous color adjustment parameter in the adjustment resumption processing. On the other hand, if the communication connection is disconnected during adjustment of the color adjustment parameter without permanently storing it, the CPU 201 can acquire the previous color adjustment parameter in the adjustment resumption processing. That is, the CPU 201 can apply the color adjustment parameter whose transmission may have failed due to the disconnection to the digital camera 100 again.

If the PC 200 repeats fine adjustment over and over, and the color adjustment parameter needs to be transmitted to the digital camera 100 and stored in its memory each time, the camera CPU 101 records the color adjustment parameter in a memory of high durability with a large rewritable count as much as possible until the permanent storage.

That is, according to the present invention, it is possible to perform the color adjustment parameter setting operation many times while protecting a memory of low durability with a small rewritable count as much as possible.

<Automatic Saving Processing>

Figure 5:
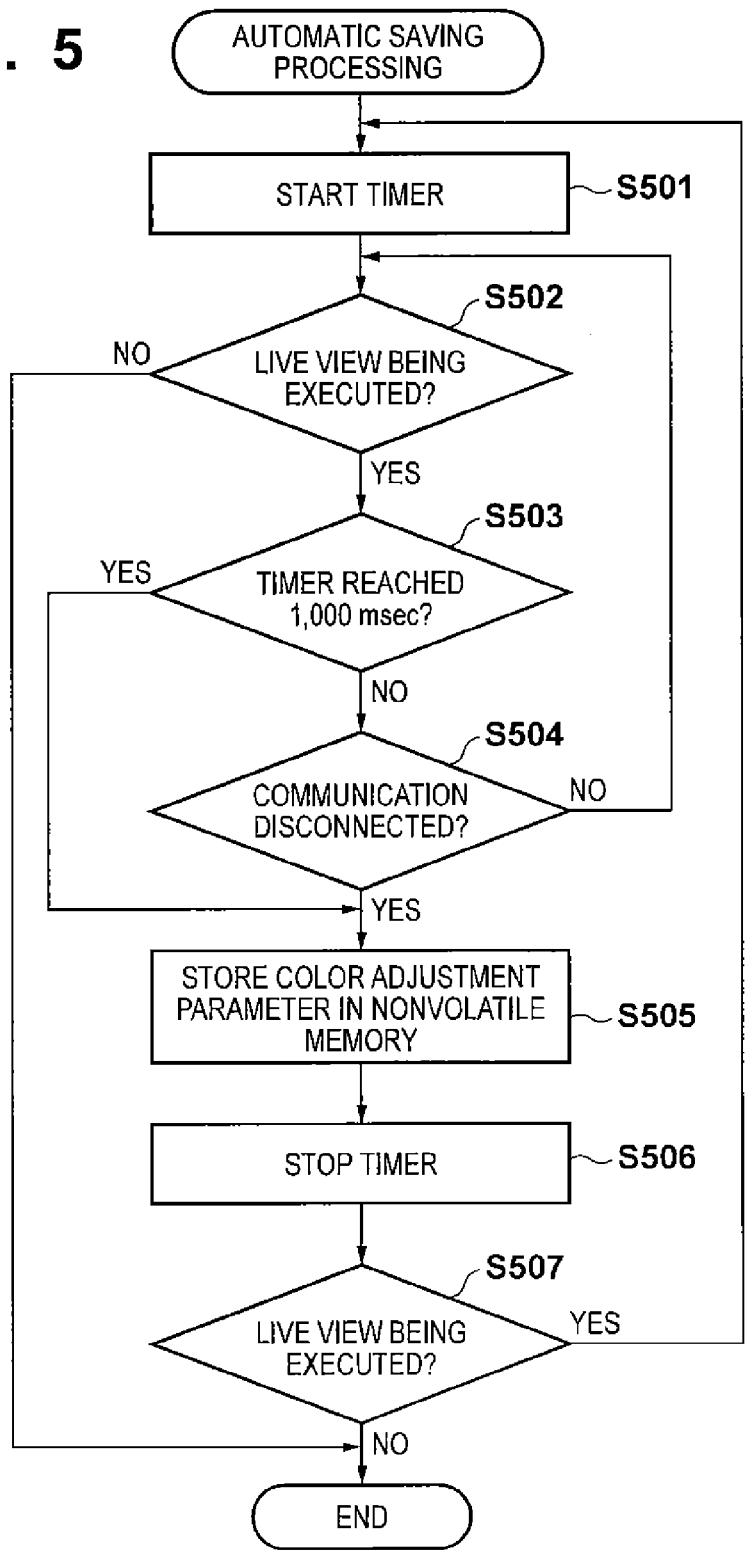
FIG. 5 is a flowchart illustrating automatic serving processing executed by a digital camera 100 according to the embodiment of the present invention.

Next, automatic saving processing executed by the digital camera 100 according to this embodiment to automatically store, in the camera nonvolatile memory 103, the color adjustment parameter stored in the camera volatile memory 104 will be described in detail with reference to the flowchart of FIG. 5. Processing corresponding to the flowchart can be implemented by causing the camera CPU 101 to, for example, read out a corresponding processing program stored in the camera ROM 102 and extract and execute it on a camera RAM (not shown). Note that the automatic saving processing is executed in the digital camera 100 in parallel to the above-described color adjustment processing during execution of the color adjustment processing.

In step S501, the camera CPU 101 starts measuring the time until automatic saving using an internal timer (not shown).

In step S502, the camera CPU 101 determines whether live view image display is being executed on the PC 200. More specifically, the camera CPU 101 determines whether the camera communication unit 108 has received the live view image external output request but not the external output stop request. Upon determining that the live view image display is being executed, the camera CPU 101 advances the process to step S503. Upon determining that the live view image display is not being executed, the camera CPU 101 completes the automatic saving processing.

In step S503, the camera CPU 101 determines whether the time measurement started in step S501 has reached, for example, 1,000 msec. In this embodiment, the description will be made assuming that the digital camera 100 stores the color adjustment parameter in the camera nonvolatile memory 103 at a 1000-msec interval. However, the saving interval is not limited to this, as can easily be anticipated. Upon determining that the time measurement has reached 1,000 msec, the camera CPU 101 advances the process to step S505. Upon determining that the time measurement has not reached 1,000 msec, the camera CPU 101 advances the process to step S504.

In step S504, the camera CPU 101 determines whether the communication connection between the digital camera 100 and the PC 200 has been disconnected. Upon determining that the communication connection between the digital camera 100 and the PC 200 has been disconnected, the camera CPU 101 advances the process to step S505. Upon determining that the communication connection has not been disconnected, the camera CPU 101 returns the process to step S502.

In step S505, the camera CPU 101 copies the color adjustment data stored in the camera volatile memory 104 to the camera nonvolatile memory 103 and updates the color adjustment parameter stored in the camera nonvolatile memory 103.

In step S506, the camera CPU 101 ends the time measurement started in step S501.

In step S507, the camera CPU 101 determines whether live view image display is being executed on the PC 200. Upon determining that the live view image display is being executed, the camera CPU 101 returns the process to step S501. Upon determining that the live view image display is not being executed, the camera CPU 101 completes the automatic saving processing.

This allows even the digital camera 100 to store, in the camera volatile memory 104, the color adjustment parameter applied immediately before the disconnection of the communication connection. Since at least the color adjustment parameter adjusted halfway through by the color adjustment processing can be reflected on the digital camera 100, the user can use the digital camera 100 while applying the color adjustment parameter under adjustment even without resuming the color adjustment processing.

As described above, the information processing apparatus according to this embodiment can efficiently set the image processing parameter for the connected image sensing apparatus. More specifically, the information processing apparatus decides the image processing parameter for a developed image while displaying the developed image received from the image sensing apparatus. The decided color adjustment parameter is transmitted to the image sensing apparatus and also held in a storage region. Upon detecting that the communication connection with the image sensing apparatus was disconnected and then reconnected, the information processing apparatus transmits the color adjustment parameter held in the storage region to the image sensing apparatus.

[Modification]

In the adjustment resumption processing of the above-described embodiment, if the color adjustment parameter exists in the temporary holding region of the recording medium 202 of the PC 200, the CPU queries the user whether to resume the color adjustment using the color adjustment parameter. This is effective when, for example, the application corresponding to color adjustment processing is a dedicated application for image sensing apparatuses of a specific model. However, if the application is designed for general-purpose image sensing apparatuses, the following problem may arise. That is, if an image sensing apparatus of a model different from the image sensing apparatus connected in the previous color adjustment processing is connected, a color adjustment parameter decided for the different image sensing apparatus may be applied.

To cope with this situation, the CPU 201 may acquire identification information representing the model type or individual type of the connected digital camera 100 when it is connected. In the color adjustment processing, the CPU 201 stores the color adjustment parameter in the temporary holding region in association with the identification information. This allows to store the color adjustment parameter in the PC 200 on the model or individual basis. That is, in the adjustment resumption processing, if a color adjustment parameter associated with the same identification information as that of the connected digital camera 100 is stored in the temporary holding region, the CPU 201 queries the user whether to resume, as in the above-described embodiment. If the color adjustment parameter associated with the same identification information as that of the connected digital camera 100 is not stored in the temporary holding region, the CPU 201 starts the color adjustment processing from the initial state to avoid unnecessary application.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (for example, computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-089677, filed Apr. 10, 2012, which is hereby incorporated by reference herein in its entirety.

What is claimed is:

1. An information processing apparatus for setting an image processing parameter used to generate a developed image in a connected image sensing apparatus and transmitting the image processing parameter to the image sensing apparatus, comprising:
   a reception unit configured to receive the developed image from the image sensing apparatus;
   a display unit configured to display the developed image received by said reception unit;
   a setting unit configured to set the image processing parameter to generate a developed image;
   a transmission unit configured to transmit the image processing parameter set by said setting unit to the image sensing apparatus;
   a holding unit configured to hold, in a storage unit, the image processing parameter set by said setting unit; and
   a detection unit configured to detect communication connection with the image sensing apparatus,
   wherein when said detection unit has detected that the communication connection was disconnected and then reconnected, said transmission unit transmits the image processing parameter held in the storage unit to the image sensing apparatus.

2. The apparatus according to claim 1, wherein said reception unit further receives, from the image sensing apparatus, information representing that the image processing parameter is permanently held, and
   upon receiving the information representing that the image processing parameter is permanently held, said holding unit deletes the held image processing parameter from the storage unit.

3. The apparatus according to claim 1, wherein said reception unit further receives identification information of one of a model type and an individual type of the image sensing apparatus,
   said holding unit stores the image processing parameter in association with the identification information, and
   when said detection unit has detected that the communication connection was disconnected and then reconnected, said transmission unit transmits the image processing parameter held in the storage unit to the image sensing apparatus, the image processing parameter being associated with the same identification information as the identification information received from the connected image sensing apparatus.

4. The apparatus according to claim 3, further comprising a query unit configured to query whether to transmit the image processing parameter when the image processing parameter associated with the same identification information as the identification information received from the connected image sensing apparatus is held in the storage unit.

5. The apparatus according to claim 1, wherein said setting unit does not change the image processing parameter after said transmission unit has transmitted the image processing parameter until said reception unit receives the developed image to which the image processing parameter is applied.

6. The apparatus according to claim 1, wherein said transmission unit automatically transmits the image processing parameter in accordance with setting of the image processing parameter by said setting unit, or transmits the image processing parameter together with a command to permanently hold the image processing parameter in a memory of the image sensing apparatus in accordance with a user instruction.

7. A control method of an information processing apparatus for setting an image processing parameter used to generate a-developed image in a connected image sensing apparatus and transmitting the image processing parameter to the image sensing apparatus, comprising:
   a reception step in which a reception unit of the information processing apparatus receives the developed image from the image sensing apparatus;
   a display step for displaying the developed image received in the reception step;
   a setting step for setting the image processing parameter to generate a developed image;
   a transmission step for transmitting the image processing parameter set in the setting step to the image sensing apparatus;
   a holding step for holding, in a storage unit, the image processing parameter set in the setting step; and
   a detection step for detecting communication connection with the image sensing apparatus, wherein when it is detected in the detection step that the communication connection was disconnected and then reconnected, the image processing parameter held in the storage unit is transmitted to the image sensing apparatus in the transmission step.

8. The method according to claim 7, wherein information representing that the image processing parameter is permanently held is further received from the image sensing apparatus in the reception step, and
upon receiving the information representing that the image processing parameter is permanently held, the image processing parameter held in the storage unit is deleted.

9. The method according to claim 7, wherein identification information of one of a model type and an individual type of the image sensing apparatus is further received in the reception step,
the image processing parameter is stored in association with the identification information in the storage unit, and
when it is detected in the detection step that the communication connection was disconnected and then reconnected, the image processing parameter held in the storage unit is transmitted to the image sensing apparatus in the transmission step, the image processing parameter being associated with the same identification information as the identification information received from the connected image sensing apparatus.

10. The method according to claim 9, further comprising a query step for querying whether to transmit the image processing parameter when the image processing parameter associated with the same identification information as the identification information received from the connected image sensing apparatus is held in the storage unit.

11. The method according to claim 7, wherein the image processing parameter is not changed after the image processing parameter has been transmitted in the transmission step until the developed image, to which the image processing parameter is applied, is received in the reception step.

12. The method according to claim 7, wherein, in the transmission step, the image processing parameter is automatically transmitted in accordance with setting of the image processing parameter in the setting step, or the image processing parameter together with a command to permanently hold the image processing parameter in a memory of the image sensing apparatus is transmitted in accordance with a user instruction.

13. A computer-readable recording medium storing a program for causing a computer, which sets an image processing parameter used to generate a developed image in a connected image sensing apparatus and transmits the image processing parameter to the image sensing apparatus, to execute the following processing:
processing for receiving the developed image from the image sensing apparatus;
processing for displaying the developed image which is received from the image sensing apparatus;
processing for setting the image processing parameter to generate a developed image;
processing for transmitting the image processing parameter in the processing for receiving to the image sensing apparatus;
processing for holding, in a storage unit of the computer, the image processing parameter in the processing for receiving;
processing for detecting communication connection with the image sensing apparatus, wherein when it is detected that the communication connection was disconnected and then reconnected, the image processing parameter held in the storage unit is transmitted to the image sensing apparatus.

14. The recording medium according to claim 13, wherein information representing that the image processing parameter is permanently held is further received from the image sensing apparatus in the processing for receiving, and
upon receiving the information representing that the image processing parameter is permanently held, the program causes the computer to delete the image processing parameter held in the storage unit.

15. The recording medium according to claim 13, wherein identification information of one of a model type and an individual type of the image sensing apparatus is further received in the processing for receiving,
the image processing parameter is stored in association with the identification information in the processing for storing, and
when it is detected that the communication connection was disconnected and then reconnected, the image processing parameter held in the storage unit is transmitted to the image sensing apparatus in the processing for transmitting, the image processing parameter being associated with the same identification information as the identification information received from the connected image sensing apparatus.

16. The recording medium according to claim 15, the program causes the computer to further execute processing for querying whether to transmit the image processing parameter when the image processing parameter associated with the same identification information as the identification information received from the connected image sensing apparatus is held in the storage unit.

17. The recording medium according to claim 13, wherein the image processing parameter is not changed after the image processing parameter has been transmitted in the processing for transmitting until the developed image, to which the image processing parameter is applied, is received in the processing for receiving.

18. The recording medium according to claim 13, wherein, in the processing for transmitting, the image processing parameter is automatically transmitted in accordance with setting of the image processing parameter in the processing for setting, or the image processing parameter together with a command to permanently hold the image processing parameter in a memory of the image sensing apparatus is transmitted in accordance with a user instruction.

19. An image sensing system for causing an information processing apparatus connected to an image sensing apparatus to set an image processing parameter used to generate a developed image in the image sensing apparatus,
the image sensing apparatus comprising:
an image sensing unit configured to sense an object and output an image sensing signal;
a first reception unit configured to receive, from the information processing apparatus, the image processing parameter applied to the image sensing signal output from said image sensing unit;
a storage unit configured to store, in a volatile memory, the image processing parameter received by said first reception unit;
a generation unit configured to generate the developed image by applying the image processing parameter to the image sensing signal; and a first transmission unit configured to transmit the developed image generated by said generation unit to the information processing apparatus, and the information processing apparatus comprising:

a second reception unit configured to receive the developed image from the image sensing apparatus;

a display unit configured to display the developed image received by said second reception unit;

a setting unit configured to set the image processing parameter to generate a developed image;

a second transmission unit configured to transmit the image processing parameter set by said setting unit to the image sensing apparatus;

a holding unit configured to hold, in a storage unit, the image processing parameter set by said setting unit; and a detection unit configured to detect communication connection with the image sensing apparatus, wherein when said detection unit has detected that the communication connection was disconnected and then reconnected, said second transmission unit transmits the image processing parameter held in the storage unit to the image sensing apparatus.

\* \* \* \* \*